H. KNOCH.
TIRE FOR AUTOMOBILE WHEELS.
APPLICATION FILED MAR. 4, 1911.
1,034,468.
Patented Aug. 6, 1912.
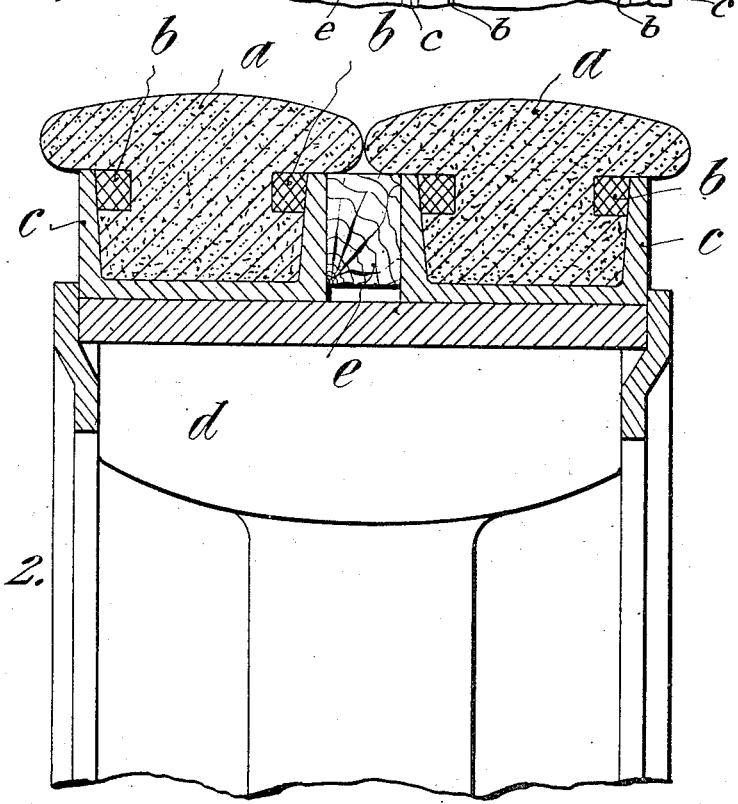

UNITED STATES PATENT OFFICE.

HEINRICH KNOCH, OF ADLERSHOF, NEAR BERLIN, GERMANY.

TIRE FOR AUTOMOBILE-WHEELS.

1,034,468.   Specification of Letters Patent.   Patented Aug. 6, 1912.

Application filed March 4, 1911. Serial No. 612,298.

*To all whom it may concern:*

Be it known that I, HEINRICH KNOCH, manufacturer, a citizen of the German Empire, residing at Adlershof, near Berlin, in the Kingdom of Prussia, Germany, have invented certain new and useful Improvements in Tires for Automobile-Wheels; and I do hereby declare the following to be a full, clear, and exact description of the invention, such as will enable others skilled in the art to which it appertains to make and use the same.

My invention relates to improvements in tires for automobile wheels, and more particularly to tires which are particularly adapted for heavy loads. And the object of the improvements is to provide a tire which is particularly durable, which can be manufactured at low cost, and which does not slip on a wet or slippery road.

With these objects in view my invention consists in composing the tire, of suitably shaped, solid, hardened pieces of wool felt.

My invention will be more fully described in connection with the accompanying drawing and will be more particularly pointed out in and by the appended claim.

In the drawings: Figure 1 is a plan view of one embodiment of my invention with the tire omitted on the left hand side thereof. Fig. 2 is a sectional view on line 2—2 of Fig. 1 with the tire blocks or pieces in place on both sides.

Like characters of reference designate similar parts throughout the different figures of the drawings.

As shown, the tire is composed of pieces $a$ of pure wool felt, which is hardened and made waterproof in any suitable way, without however impairing its elasticity. The pieces of felt, which may have any preferred cross-section, are held together by means of rings $b$, and flanged rings $c$. The tire which is thus formed of the blocks $a$, and the rings $b$ and $c$ is secured to the rim $d$ of the wheel, as is known in the art.

In the example shown, which is particularly designed for use in freight cars, the rim is provided with two tires which are preferably separated by a filling or spacing ring $e$. The latter is preferably made of wood. In cases in which the load on the wheel is smaller, a single tire will be sufficient.

To facilitate assembling of the parts, the rings $c$ may be made in halves or the rings $b$ may be split so as to be sprung over the rings $c$. However, the rings $b$ may be riveted to the channel $c$ before the parts are assembled and the elasticity of the felt blocks $a$ will be sufficient to permit them to be pressed into position.

In accordance with my invention it will be noticed that the felt blocks are not wedged into the channels but merely fit the channels closely and are locked in place by the rings $b$. It will thus be seen that I may utilize solid material for the channel $c$ as the inner faces are smooth and unbroken and no shoulders or recesses, or other special portions are necessary. By reason of the fact that I do not rely upon a wedge engagement of the blocks with the channels in order to hold the former in place, I thereby avoid the provision of lining between the felt blocks and the inner faces of the channel.

I claim herein as my invention:

In a vehicle wheel, the combination of a felly, a tire thereon composed of solid blocks provided with laterally disposed grooves therein, rings sunk in said grooves with their outer faces flush with the outer side faces of said blocks, and means fitting the flush sides of said blocks and rings for securing the tire to said felly.

In testimony whereof I hereunto affix my signature in the presence of two witnesses.

HEINRICH KNOCH.

Witnesses:
 WOLDEMAR HAUPT,
 HENRY HASPER.